United States Patent [19]

Sonnenberg

[11] 4,421,448
[45] Dec. 20, 1983

[54] SELF-DUMPING BIN

[76] Inventor: Berthold Sonnenberg, R.R. #3, Waterford, Ontario, Canada, N0E 1Y0

[21] Appl. No.: 240,056

[22] Filed: Mar. 3, 1981

[30] Foreign Application Priority Data

Mar. 14, 1980 [CA] Canada .................................. 347667

[51] Int. Cl.³ ............................................ B65G 65/66
[52] U.S. Cl. ..................................... 414/411; 414/420
[58] Field of Search ............... 414/411, 414, 420, 422, 414/785

[56] References Cited

U.S. PATENT DOCUMENTS 2,730,252  1/1956  Oswalt ................................. 414/411
3,011,666 12/1961  Dempster et al. .............. 414/411 X
3,984,017 10/1976  Giles .................................... 414/414

Primary Examiner—Robert G. Sheridan

[57] ABSTRACT

A self-dumping produce bin adapted to be transported on a pair of forks pivotally mounted on the free ends of a pair of tractor mounted front end loader arms movable between raised and lowered positions, the forks being arranged to permit a bin carried by them to be movable between a produce bin lifting position, a produce bin carrying position, and a produce bin dumping position. A door in the front of the bin is self closing when the bin is moved from its produce dumping position to its produce transporting position. A bin door opening mechanism is mounted on the bin and actuable automatically by a gravity operated door tripping mechanism mounted on one of said pair of forks, when said produce bin is moved by the arms from its produce carrying position to its produce dumping position.

9 Claims, 8 Drawing Figures

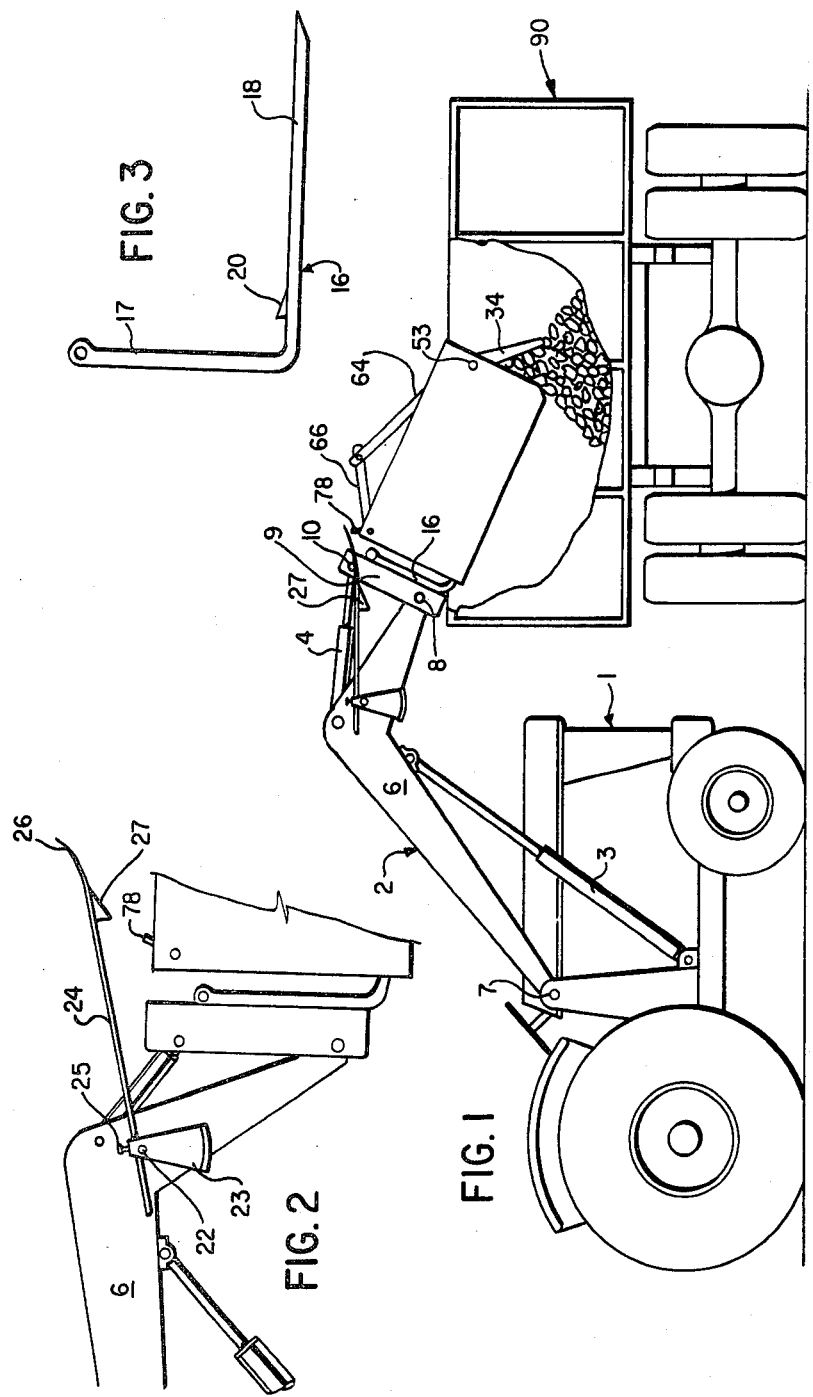

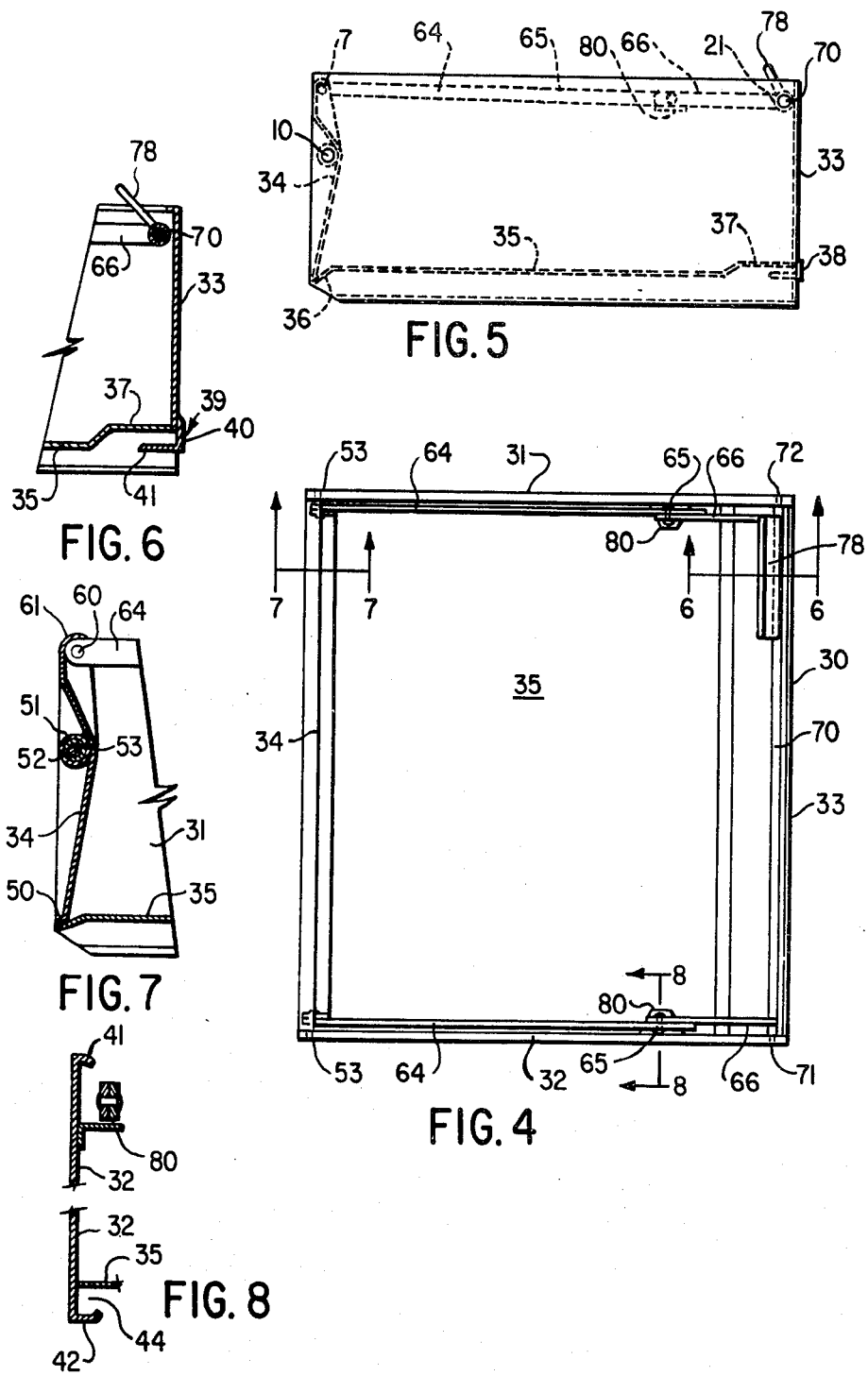

SELF-DUMPING BIN

This invention relates to a self-dumping bin. More particularly it relates to a self-dumping produce bin which is particularly suited for use on farms for transporting loose fruit and vegetables.

BACKGROUND OF THE INVENTION

The bulk handling of farm produce is increasing each year in volume and in kind of produce. One of the problems involved in the bulk handling of farm produce is the transfer of loose fruit or vegetables from wagons used in the field to receive the picked produce, to large highway trucks used to haul the produce to the processor. At the present time, several different systems are used for the purpose of transporting produce from wagon to truck but each of these frequently result in substantial damage occurring during transport of crops such as tomatoes.

Obviously anything which can be done to simplify handling and/or reduce produce damage, while at the same time being relatively inexpensive to manufacture, would be an asset in the handling of produce.

The present invention provides an apparatus which is believed to overcome, or to at least reduce disadvantages associated with some of the prior art produce transporting equipment. It consists of, in general, a portable bin that can be used on most standard types of flat-bed farm wagons. When the bin has been filled, one man can transfer the bin and contents to a highway truck using a front end loader of the type commonly found on most farm tractors.

The apparatus is designed so that on arrival at the truck, movement of the bin by the front end loader from a generally horizontal transporting mode to a tipped produce dumping mode will result in the automatic opening of a door in the bin through the use of a gravity operated door opening mechanism.

It is an advantage of the produce bin and its associated self-dumping apparatus that it can readily be attached to almost any standard front end loader on a farm tractor and that it can be manipulated when dumping the produce to minimize substantially, damage to the produce. In addition, as compared with certain known prior art means of transporting farm produce from pickers to highway trucks, the apparatus of this invention is labour saving, requiring only one man.

BRIEF SUMMARY OF THE INVENTION

More specifically, this invention relates to a self-dumping produce bin adapted to be transported on a pair of forks pivotally mounted on the free ends of a pair of tractor mounted front end loader arms movable between raised and lowered positions, the forks being arranged to permit a bin carried by them to be movable between a produce bin lifting position, a produce bin carrying position, and a produce bin dumping position. A door in the front of the bin is self closing when the bin is moved from its produce dumping position to its produce transporting position. A bin door opening mechanism is mounted on the bin and actuable automatically by a gravity operated door tripping mechanism mounted on one of said pair of forks, when said produce bin is moved by the arms from its produce carrying position to its produce dumping position.

LIST OF FIGURES OF THE DRAWINGS

Referring to the attached drawings which depict a preferred embodiment of the present invention;

FIG. 1 is a side view of a farm tractor having a produce bin constructed in accordance with the present invention mounted on its front end loader mechanism and showing the manner in which produce is dumped into a truck, the rear view of which is shown with parts broken away;

FIG. 2 is a side view of a part of the mechanism shown in FIG. 1 but with the produce bin of the invention, partially broken away, and shown in generally horizontal, produce carrying position;

FIG. 3 is a side view of one of a pair of modified forks used in the apparatus of FIG. 1;

FIG. 4 is a plan view of the produce bin of the present invention disconnected from the front end loading mechanism of the tractor of FIG. 1;

FIG. 5 is a side view of the bin of FIG. 4; and

FIGS. 6, 7 and 8 are partially broken away sections taken along the lines, 6—6, 7—7, and 8—8 respectively of the bin of FIG. 4.

DESCRIPTION OF THE INVENTION

Referring to FIG. 1 there is shown a conventional farm tractor 1 having mounted on it a conventional front end loader mechanism 2 hydraulically actuated by two lifting cylinders (only one shown) 3 and two dumping cylinders (one one shown) 4.

As is conventional, the front end loader apparatus 2 includes a pair of arms 6 (only one shown) the inboard ends of which are pivotally mounted at 7 on the tractor's frame and to the outboard ends of which there is pivotally mounted at 8 a fork securing member 9 to the upper end of which is pivotally secured at 10 the free ends of the dumping cylinders 4. A pair of forks 16 (only one shown) are secured in parallel spaced apart position on the fork securing member 9 as is also conventional. It will be understood that as is conventional the described apparatus permits the forks to be raised and lowered relative to the ground while their projecting portions are maintained in relatively horizontal positions while, at the same time, permitting the forks to be tilted upwardly or downwardly from their horizontal position as necessary and generally irrespective of their height above the ground, this fork control being conventionally achieved through use of the lifting and dumping hydraulic cylinders 3 and 4 respectively.

Referring to FIG. 3 it will be seen that the fork 16 includes a vertical arm 17 and a horizontal arm 18 and that there is provided on the horizontal arm adjacent that end connected to the vertical arm, a produce bin retaining lug 20.

As shown in FIG. 2 there is pivotally mounted at 22, on right hand arm 6 of the front end loader apparatus, a generally triangular weight 23 through the upper apex of which passes a rod 24 secured by set screw 25. The free end of rod 24 is turned upwardly at 26 and is provided with a wedge-shaped hook 27. The distance between the pivot point 22 and the hook 27 can be adjusted by releasing the set screw 25 and sliding the rod 24 in either direction through weight 23. Weight 23 together with its rod 24 are arranged to function as a gravity operated automatic, produce bin door-tripping mechanism by reason of the fact that it is designed so that the force of gravity maintains rod 24 in a more or less horizontal position relative to the ground irrespective of the position of arm 6 relative to the ground, as will be explained below.

The structure of the bin is depicted in FIGS. 4 to 8, to which reference is now made. The bin 30 is of an almost square shape in plan view as shown in FIG. 4 and includes side walls 31 and 32, a rear wall 33, a front wall in the form of a door 34 and a generally flat floor 35. The bin is constructed principally of formed sheet-metal welded together. Plastic might also be used for parts of the bin.

Referring to FIG. 5, there is shown the flat floor 35 by broken line and it will be seen to include a downwardly turned lip 36 co-operable with a bottom edge of the door 34 and an upwardly offset portion 37 to permit the forks 16 to slide in from the right hand side as viewed in the Figure, and along the bottom of the floor 35 without the floor interferring with retaining lugs 20 on the forks.

As also depicted in FIG. 5, and in FIG. 6, the rear wall 33 is flat with a slight inwardly turned lip provided along its upper edge and with a right-angled bumper 39 being secured along its bottom edge, the vertical flange 40 of the bumper 39 being arranged to abut the vertical arm 17 on fork 16 when the fork is moved into produce bin lifting position. The horizontal inwardly projecting flange 41 is positioned so that when the forks are in produce bin lifting position the free edge of the flange engages with retaining lugs 20 on the forks 16 to prevent the bin from sliding off of the forks even when it is tipped downwardly, until such time as the operator desires to disengage the forks from the bin. This he can do by resting the bin on a flat bed of a wagon or any other generally horizontal support and then moving the forks vertically downward so that the flange disengages from the retaining lugs 20.

Both side walls 31 and 32 are of the same shape and simply mirror images and a section of side 32 is shown in FIG. 8. Wall 32 includes an inwardly turned flange 42 extending along its bottom edge, the free end of flange 42 being turned slghtly upwardly to define, in conjunction with the floor 35 and the side wall 32, a socket 44 to receive a fork 16, the forks 16 being spaced apart on the fork securing member 9 a distance adequate to permit each of the forks to be slid into the respective sockets extending along the bottom edges of each of the side walls 31 and 32.

While the self closing door 34 is shown in each of FIGS. 4, 5 and 7, reference is made in particular to FIG. 7. A transverse cross-section of the door as shown in FIG. 7 is seen to include a lower lip 50 and a generally shallow V-shaped face with the trough of the V being located above the longitudinal centre line of the door and having secured along the trough for the length of the door a tube 51 within which is located a filler tube 52 within which is located a shaft 53 which passes through both side walls 31 and 32 and is fixed to both the side walls thereby providing a horizontal pivot about which the door 34 can rotate to move from its closed position as shown in FIG. 7 to its open position as shown in FIG. 1 and also to be self closing.

Door 34 also includes a shaft 60 extending along the upper edge of the door and projecting from either end and being held in position by a turned over edge portion of the door 61. To either end of shaft 60 is secured an arm or link 64 each of which arms or links 64 are pivotally connected at 65 to another pair of arms or links 66 which extend rearwardly to be connected with a shaft 70 pivotally mounted at 71 and 72 in the bin's side walls 32 and 31, respectively. Shaft 70 also has secured to it a flat plate shaped catch 78, this being located adjacent the end of shaft 70 near side wall 31. Catch 78 projects upwardly and forward and is adapted to co-operate with hook 27 on rod 24 as explained hereinbelow.

There are provided on each of the side walls 31 and 32 a pair of stops 80 which are best seen in FIGS. 4 and 8. These stops are secured to their respective side walls at a position which prevents the interconnected ends of each pair of linked arms 64 and 66 from moving downwardly over-centre when the door is closed. The arms or links should be positioned as best depicted in FIG. 5 by way of dotted line, when against the stops.

In operation, when the tractor operator picks a produce bin from off of a wagon the weight 23 and rod 24 are so constructed that the rod 24 and hook 27 are maintained out of contact with the produce bin. When the loader arms 6 are raised towards their uppermost position, with the produce bin being held in a generally level position relative to the ground, rod 24 makes contact with the catch member 78 and when the dumping hydraulic cylinders 4 are activated, catch member 78 slides along the underside of rod 24 until it makes contact with hook 27 which, while the dumping operation continues, momentarily retains catch member 78 stationary relative to rod 24 thereby causing arm 66 to pivot upwardly as shown in FIG. 1. This results in upward momement of the linked arms 66 and 64 and arms 64 being pivotally connected to the upper edge of door 34, cause that upper edge to move towards the rear wall of the bin thereby opening the lower portion of door 34 and releasing the produce into the box of a truck 90 as depicted in FIG. 1. It will be appreciated from FIG. 1 that once catch member 78 has been temporarily retained by hook 27 during the dumping operation to the extent necessary to open the door 34, the catch member 78 will then disengage itself from the hook member because of the angle assumed by the catch member 78 so that ultimately when the produce is being dumped as in FIG. 1 the catch member 78 will be disengaged and spaced some distance from the hook 27.

Once the bin has been emptied, its return by the tractor operator to its level or horizontal position will cause the door 34 to close automatically with the arms or links 64 and 66 returning to their rest position as determined by stops 80.

It will be seen that when the arms 6 are located towards their uppermost position and the bin 30 is brought to its level position, if the free end of the rod 24 was not turned up at 26 it might abut against the rear wall of the bin thereby damaging the rod. Consequently the upturned end 26 permits the end of the rod to ride over the catch member 78. Ultimately, while initially the catch member 78, when the arms 6 are in their uppermost position, might re-engage with the hook 27, when the bin, in a level position is lowered back on to a wagon the hook will disconnect itself from the catch member without re-opening the door. Clearly to achieve the automatic bin door opening provided by the apparatus of this invention the pivot point 22 for the weight 23 will have to be selected so that when the arms 6 are at or near their uppermost position the catch member 78 will have to be in contact with the rod 24 between the weight 23 and the hook 27.

There has thus been provided a produce bin which can readily be transported by a tractor provided with a front end loader to which are attached a pair of forks. Simply through the attachment of the weight 23 and rod 24, to an arm at an appropriate point, one can achieve, through the use of the bin of the present invention, an arrangement whereby the bin door is automatically opened when the bin is properly positioned to permit dumping of produce into a highway truck for transport of the produce to processors. The bin is simple and relatively inexpensive to construct and the door release mechanism is equally simple to construct and maintain and because of its simplicity and its location within the produce bin it cannot readily be damaged and also being high on the inside of the sides of the bin, and moving upwardly during activation means that the door opening arms do not readily damage the produce.

Clearly the invention, while disclosed in its preferred form can take other forms. The bin could be formed, at least in part, of plastic. Also the door opening arms could be replaced by a drum and cable arrangement.

I claim:

1. A self-dumping produce bin adapted to be transported on a fork pivotally mounted on the free ends of a pair of tractor mounted arms movable between raised and lowered positions, the fork being mounted to permit a bin carried by it to be movable between a produce bin lifting position, a produce bin transporting position and a produce bin dumping position, a door on the side of the bin which door is self closing when the bin is moved from its produce dumping position to its produce transporting position, a horizontal shaft extending between the sides of the bin, the bin door being pivotable about said shaft; a bin door opening mechanism mounted on the bin, the opening mechanism having two pairs of links, one pair being located adjacent each side of the bin, the two links forming each pair being pivotably interconnected at adjacent ends, the free end of one link of each pair of being pivotably connected to the bin door adjacent the upper edge of the bin door, a rotatable shaft secured between the walls of the bin adjacent the upper edge of the bin opposite, and parallel to, the bin door, the free end of the other link of each pair being fixed to said rotatable shaft a gravity operated door tripping mechanism mounted on said one of said tractor mounted arms, the tripping mechanism being arranged to engage means fixed to said rotatable shaft to engage with said door tripping mechanism to rotate said shaft to shorten the distance between the free ends of each pair of arms to thereby positively pivotably open the bin door when said produce bin is moved from a produce transporting position to a produce dumping position.

2. The bin of claim 1, wherein means are mounted on the bin's side walls to limit over-center movement of each pair of links at their pivotal interconnection point.

3. The bin of claim 1 in combination with a tractor having arms, said tripping mechanism consisting of a pivotally mounted weight to which is secured a rod having a free end provided with means engageable with said means fixed to said rotatable shaft.

4. The combination of claim 3, wherein the engageable means is a hook.

5. A self-dumping produce bin adapted to be transported on a fork pivotally mounted on the free ends of a pair of tractor mounted arms movable between raised and lowered positions, the fork being mounted to permit a bin carried by it to be movable between a produce bin lifting position, a produce bin transporting position and a produce bin dumping position, a pivotally mounted door forming one side of the bin, said door pivoting about a horizontal axis located below its upper edge, the door being self-closing when said bin is moved from its produce dumping position to its produce transporting position, a bin door opening mechanism, said mechanism having a rotatable shaft mounted on said bin parallel to said axis and means interconnecting said shaft with said door so that rotation of said shaft in a first direction positively opens said door and rotation of said shaft in a second, opposite direction allows the door to self-close and means fixed to said shaft for rotating it in said first direction to open said bin door, a gravity operated bin door tripping mechanism mounted on one of said tractor mounted arms, said tripping mechanism being automatically engageable with said means fixed to said shaft to rotate it in said first direction to positively open said bin door when the produce bin is moved from a produce transporting position to a produce dumping position.

6. The bin of claim 5 wherein said means interconnecting said shaft with said door includes two pairs of links, one pair being located adjacent each side of the bin, the two links forming each pair pivotally interconnected at adjacent ends, the free end of one link of each pair being pivotally connected to the bin door adjacent its upper edge, the free end of the other link of each pair being fixed to said rotatable shaft.

7. The bin of claim 6, wherein means are mounted on the bin's side walls to limit over-center movement of each pair of links at their pivotal interconnection point.

8. The bin of claim 6 in combination with a tractor having arms, said gravity operated tripping mechanism consisting of a pivotally mounted weight to which is secured a rod having a free end provided with means engageable with said means fixed to said rotatable shaft.

9. The combination of claim 6, wherein the engageable means is a hook.

* * * * *